(12) United States Patent
Bryan

(10) Patent No.: US 6,697,089 B1
(45) Date of Patent: Feb. 24, 2004

(54) USER SELECTABLE APPLICATION GRAMMAR AND SEMANTICS

(75) Inventor: Shane A. Bryan, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/552,742

(22) Filed: Apr. 18, 2000

(51) Int. Cl.[7] ................................................. G09G 5/00
(52) U.S. Cl. ........................ 345/747; 345/703; 345/705
(58) Field of Search ................................. 345/703, 705, 345/706, 707, 866, 708, 745, 747, 809, 811; 705/1, 6, 7, 10

(56) References Cited

U.S. PATENT DOCUMENTS

| | | | |
|---|---|---|---|
| 5,594,642 A | 1/1997 | Collins et al. | |
| 5,715,416 A | 2/1998 | Baker | |
| 5,727,950 A | 3/1998 | Cook et al. | 434/350 |
| 5,793,368 A | 8/1998 | Beer | |
| 5,809,492 A | 9/1998 | Murray et al. | 709/45 |
| 5,835,768 A * | 11/1998 | Miller et al. | 345/703 |
| 5,917,484 A * | 6/1999 | Mullaney | 345/703 |
| 5,966,691 A | 10/1999 | Kibre et al. | 704/260 |
| 5,999,908 A * | 12/1999 | Abelow | 434/118 |
| 6,005,568 A | 12/1999 | Simonoff et al. | |
| 6,088,731 A * | 7/2000 | Kiraly et al. | 709/202 |
| 6,393,389 B1 * | 5/2002 | Chanod et al. | 704/4 |
| 6,411,953 B1 * | 6/2002 | Ganapathy et al. | 707/3 |
| 6,434,523 B1 * | 8/2002 | Monaco et al. | 704/257 |
| 6,438,545 B1 * | 8/2002 | Beauregard et al. | 707/6 |

* cited by examiner

Primary Examiner—John Cabeca
Assistant Examiner—Brian Detwiler
(74) Attorney, Agent, or Firm—Raymond A. Jenski

(57) ABSTRACT

In order that an improved communications interface between a human and a computer be provided, the interface to the computer program is directed to accommodate the variabilities of human communication rather than accommodate the rigid structure of syntax, grammar, and semantics normally used in communications with a computer. A computer program human interaction dialog is customized by detecting a need of the computer program to present knowledge to a user in human perceptible form and providing options of grammar and semantics for describing the knowledge. These options of grammar and semantics are presented as a choice to the user. The user's choice is saved for later use when the knowledge itself is presented.

5 Claims, 9 Drawing Sheets

---

FROM TIME-TO-TIME YOU MAY TRY TO OPEN A GRAPHICS FILE OF UNKNOWN FORMAT. IF THIS APPLICATIONS PROGRAM CANNOT AUTOMATICALLY OPEN THE FILE, WHAT MESSAGE WOULD YOU WANT PRESENTED:

☐ THE DATA FORMAT OF THE GRAPHICS FILE YOU ARE TRYING TO OPEN IS INCOMPATIBLE WITH THIS APPLICATIONS PROGRAM

☐ AN ERROR OF TYPE 202 HAS OCCURRED

☐ PROCESS THE FILE YOU ARE TRYING TO OPEN THROUGH GRAPHICS CONVERSION PROGRAM XXXX BEFORE USING THIS APPLICATIONS PROGRAM

☐ _____

CUSTOMIZE
INTERFACE
ROUTINE

FROM TIME-TO-TIME YOU MAY TRY TO OPEN A GRAPHICS FILE OF UNKNOWN FORMAT. IF THIS APPLICATIONS PROGRAM CANNOT AUTOMATICALLY OPEN THE FILE, WHAT MESSAGE WOULD YOU WANT PRESENTED:

☐ THE DATA FORMAT OF THE GRAPHICS FILE YOU ARE TRYING TO OPEN IS INCOMPATIBLE WITH THIS APPLICATIONS PROGRAM

☐ AN ERROR OF TYPE 202 HAS OCCURRED

☐ PROCESS THE FILE YOU ARE TRYING TO OPEN THROUGH GRAPHICS CONVERSION PROGRAM XXXX BEFORE USING THIS APPLICATIONS PROGRAM

If a concept were: "documents on the internet, automatically retrieved at a time you specify and printed to your preferred printer"

Please select the term below that best represents this idea.

○ Deliveries        ○ Subscription

○ Documents         ○ Publication

○ Other, please specify: [        ]

FIG. 8

If a concept were: "to prevent a regularly scheduled activity from occurring for a temporary, but unspecified period of time"

Please select the term below that best represents this idea.

○ Suspend      ○ Inactive     ○ Defer

○ Postpone     ○ Delay        ○ Hold

○ Other, please specify: [        ]

FIG. 9

USER SELECTABLE APPLICATION GRAMMAR AND SEMANTICS

BACKGROUND

This invention generally relates to a method and apparatus for computer control and more specifically relates to the method and apparatus that enables a human to interact with the computer in a manner that encourages an improving accuracy of the interaction.

It can be said that humans began to control and interact with "thinking" machines by providing coded instructions and data to the machines at the beginning to the Industrial Revolution. The punched card instructions provided to the Jacquard loom to select different patterns of woven thread anticipated the instruction sets provided to general purpose computers, today. Charles Babbage conceived a general purpose programmable Analytical Engine that could have performed complex functions defined by punched card or mechanical numerical wheel programming. Later developments in punched card technology by Herman Hollerith led to a greater ease of data input/output for tabulating machines and, ultimately, general-purpose computers. Alan Turing's Universal Turing Machine let to the understanding of a modem computer: one device that can be used for a wide range of intellectual tasks upon being supplied with the proper instruction set.

These historical advancements notwithstanding, the instructions provided to computers have remained structured by the inflexible rules of grammar, semantics, and syntax acceptable to the machine ever since. Even modem higher level programming languages employ a rigid structure of natural language words to provide instructions to the machine. Although a human can readily understand these words, the human must learn and use only the accepted vocabulary placed in the mandated phraseology.

In order to ease communication between human and machine, graphical user interfaces (GUI) have been developed and have become universally accepted by the general public. GUI interfaces to the computer have used pictorial devices such as windows, icons, menus, and pointers to visually communicate with a human user. Graphical layouts provided by movable windows, icons, and menus of this type of interface have been very successful in helping to organize information for a human on a computer display. Nevertheless, they are limited in their depiction of operating system procedures and for graphical information about files, activities, and directories available in the system. Most computer users find the graphical interface to be much easier to learn and much easier to use than a structured set of programming words and many people have described the graphical interface as "intuitive". However, some people do not find it so intuitive and need more time to learn how to use it than do others.

Despite their intuitiveness, the graphical interfaces used remain regimented. For example, the icons are typically all rectangular and of the same size, e.g. 32 by 32 pixels. They are also generally generic. That is to say, for example, that a text document concerning one subject would have the same icon as a document concerning an entirely different subject. Although some graphic manipulation applications programs provide "thumbnails" that incorporate a small representation of the file represented by the icon. Nevertheless, most file and folder icons are accompanied by a text string for identification.

In order to provide more meaningful interactions with a human, a dynamic pictorial user interface is described in U.S. Pat. No. 5,715,416. The pictorial user interface there includes a pictorial image that is linked to a file directory and that identifies the file directory. Objects in the pictorial image are icons linked to file objects and an animated character is overlaid on the pictorial image. User input causes movement of the animated character relative to the pictorial image and animates objects in the pictorial image. Input from the user is preferable through a limited input device such as a game pad controller, a mouse, or by using a limited number of keys on a normal keyboard. Input signals are mapped according to key code identical command sets, context arguments and selection arguments.

A user-adaptable interface has been described in U.S. Pat. No. 5,727,950, in which a graphical interface, an animated figure, is a computer agent to facilitate teaching of a student. The disclosed system includes for each student an agent adapted to that student which monitors its student's instructional behavior, responds to teacher direction, and controls the instructional progress, and guides its student, all of which constitute one aspect of a virtual tutor. The viewable on-screen aspect of the agent includes customizable multimedia presentation personae, which constitute quasi-human aspects of a virtual tutor. This quasi-human tutor provides some individualization based on student styles and on the requirements of the educational task. The voices, gestures and motions of the tutor's personae are derived from the chosen behaviors, student personae preferences, and the history of recent behavior by selection from tables containing a variety of sound and visual display objects. All elements of the on-screen agent display are then synthesized in an integrated display script calling for graphics, animation, video, or sound as appropriate.

While these solutions are interesting, the variability of natural language human communication is not adequately accommodated. For example, depending upon a person's background and geographic location, that person may call a soft drink a "soda", a "pop", or a popular soft drink trade name. When this person communicates with a computer, the person would feel more comfortable using a familiar term rather than a predetermined term selected by the computer (or, rather, the person originally responsible for programming the computer). Moreover, an element of possible confusion between the computer and the user can be reduced if the user and the computer agree on a grammar and syntax that is familiar to and comfortable for a particular human user.

The challenge then, is to provide an improved communications interface between the human and the intelligent machine. The improved interface should be directed to accommodate the variabilities of human communication rather than accommodate the rigid structure of the machine.

SUMMARY OF THE INVENTION

The present invention encompasses a method and apparatus for customizing a computer user interaction including identifying knowledge which a computer will present to a user. At least two options of grammar or semantics for use in conveying the knowledge is presented to the user. The user's choice of options is accepted and incorporated in presenting the knowledge to the user.

BRIEF DESCRIPTION OF THE DRAWINGS

FIG. 6 is an illustration of a dialog box which may be presented to a human user in conjunction with the flowchart of FIG. 5.

FIG. 8 and 9 are illustrations of two dialog boxes which may be presented to a human to illicit customization of grammar and semantics.

DETAILED DESCRIPTION OF THE PREFERRED EMBODIMENTS

Improved communications between human and intelligent machine is realized when the human can adjust the semantics and grammar of the interface to the intelligent machine, or to the program instruction set of the machine, to suit the background and custom of the human. Such a capability for incorporating human selection forms the foundation of the present invention.

Figure 1:
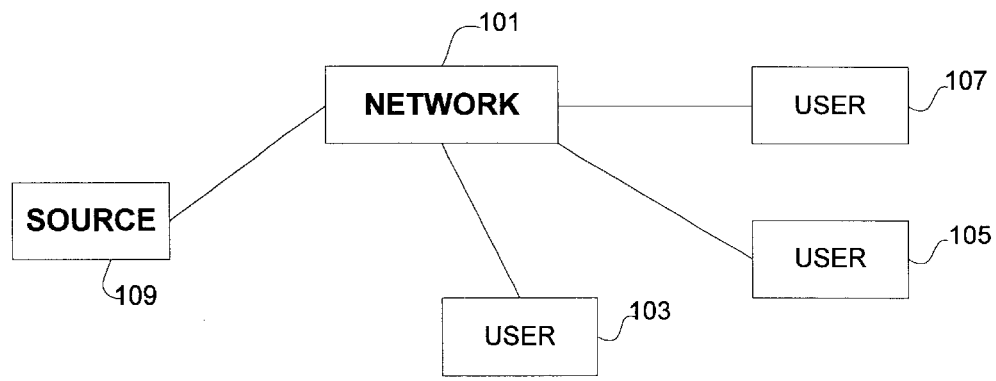
FIG. 1 is a block diagram of a communications interconnection which may make use of the present invention.

Personal computers were initially conceived as stand-alone devices, offering users a range of independent computing functions by way of application programs such as word processing, database management, or graphics manipulation programs. The growth of the Internet, however, has enabled the once stand-alone personal computer to become interconnected with many sources of information as well as other interconnected stand-alone personal computers. Such an elementary interconnection is shown in FIG. 1. Here, a network 101, such as the Internet (but also possibly an Intranet, LAN, or other computer data exchange arrangement) is connected to numerous users, for example users 103, 105, and 107. The network 101 is also connected to various sources of information, for example source 109.

Figure 2:
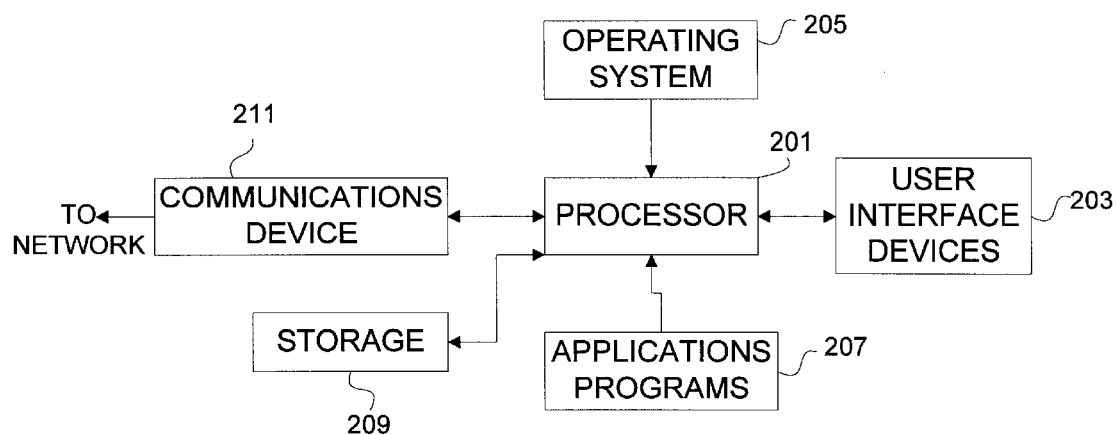
FIG. 2 is a block diagram of a user which may be incorporated into the network of FIG. 1.

A typical user, for example user 103, would include a personal computer such as that shown in FIG. 2. A processing unit, processor 201, makes human physical interface by way of a keyboard, mouse, video display, printer, and other apparatus, collectively shown as user interface devices 203. The processor 201 is directed by operating system 205 (which can be a Windows operating system, a Unix operating system, a Mac operating system, a Linux operating system, or others of similar types) to realize the basic machine parameters of the user system. Specific applications, such as word processing, data base management, graphics manipulation, etc., are installed at user 103 as application programs 207. Each of the aforementioned components interact with the inherit storage 209 to provide a computing system which satisfies the needs of the human user. Communication to the network 101 is accomplished by way of communications device 211, which is typically a modem.

Figure 3:
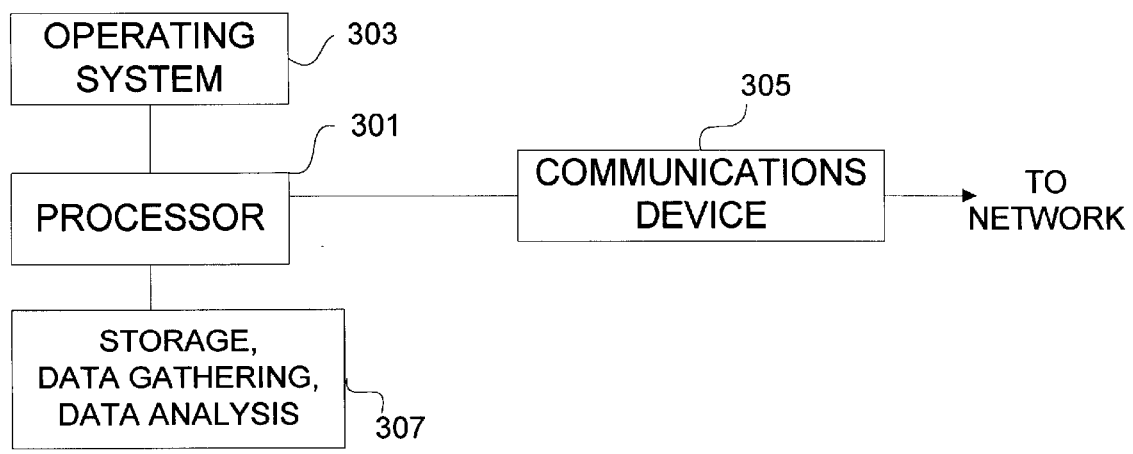
FIG. 3 is a block diagram of a source which may be incorporated into the network of FIG. 1.

A data and information source, such as source 109, is illustrated in block form in FIG. 3. Typical data sources are local files, web sites, databases, and FTP servers, which can be comprised of a processor 301 under control of a more specialized operating system 303. The source will provide data and information to a user by way of the network 101 through its communication device 305 and can provide data analysis and data gathering from the users that are in contact with the data source by way of the storage, data gathering, and data analysis of block 307.

The user selectable application grammar/semantics of the present invention grants the end user the ability to customize software applications programs and user interfaces. At the local personal computer level, this customization can be via dialog boxes during an install process; pull down menus within a program, voice activated changes, or other means. More advanced applications passively learn what the users grammar and semantics preferences are, based on observed application use. The help and other menus have their definitions dynamically changed to be more user friendly.

In a user-to-data source interchange, the grammar and semantics used by the source is customized by the human user to provide words and other human perceptible elements that are familiar and understandable to the human user. User selectable applications program grammar and semantics are particularly useful for automated document delivery systems such as that described in U.S. patent application No. 09/325,040 filed on Jun. 7, 1999, on behalf of Jon A. Brewster, et al. In a document delivery system such as that known as HP's Instant Delivery, individual document customization can be made by a user-defined grammar and semantics to interact with the instant delivery service. Additionally, market research using a selectable applications program grammar and semantics routine asks simple dialog questions to determine how "most" people would describe specific circumstances with the permission from the individual, that individual's choices are fed back to the market researcher as data to guide future releases of a product.

Figure 4:
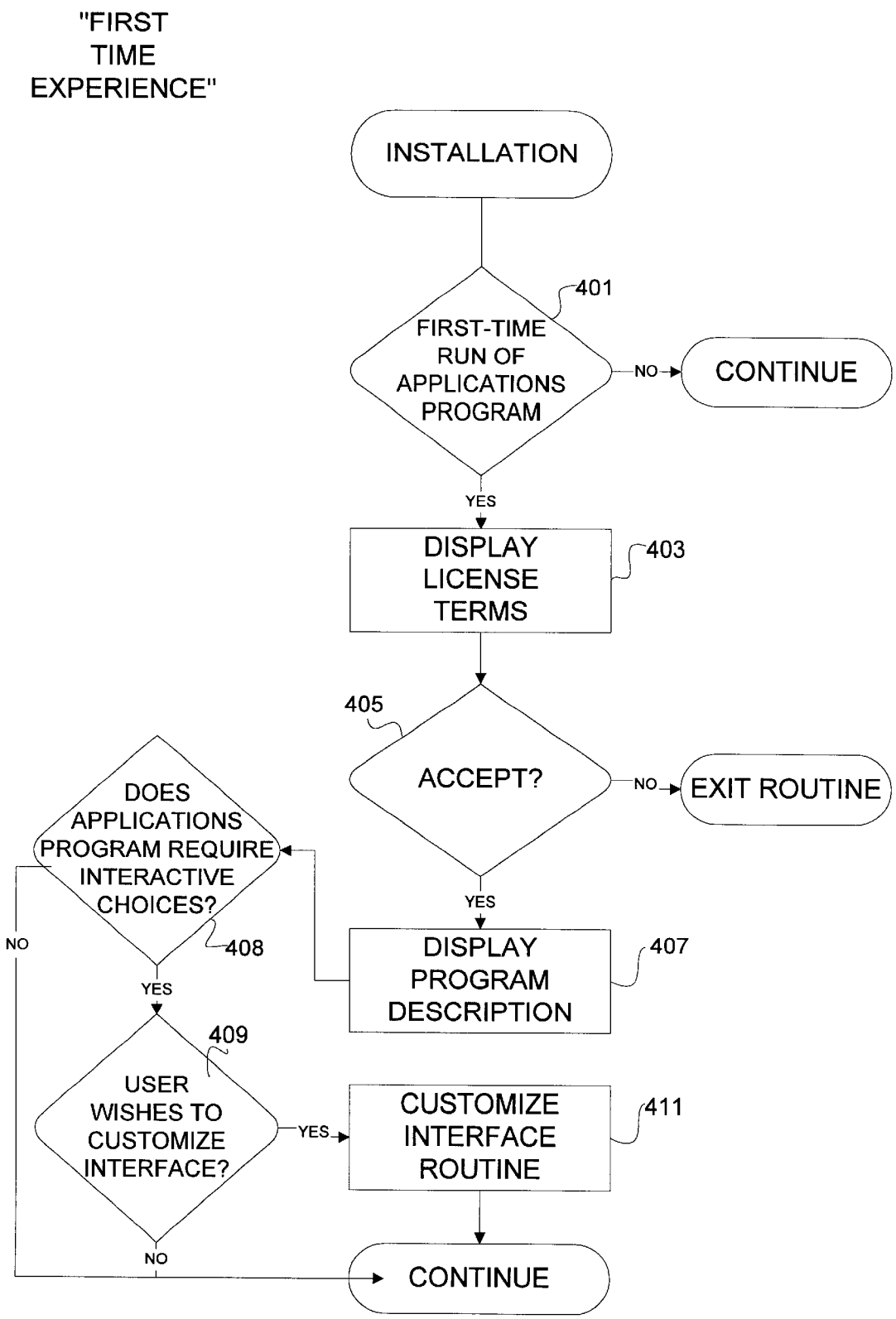
FIG. 4 is a flowchart of a "first time experience" of the user of FIG. 2.

After purchasing new software, the human user will install the software on the target personal computer for the new software to be of value. User selectable applications grammar and semantics, in a first embodiment, are set during what is referred to as the "first time experience" procedure. The first time experience is illustrated in the flowchart of FIG. 4. The user takes the physical medium containing the applications software, a CD, magnetic floppy disk, etc., and applies the medium to the personal computer. After following the installation commencement activities, a determination is made during the installation process of whether this is the first time run of this particular applications program, at block 401. If it is, there may be a display of the license terms and other relevant materials such as copyright notice at block 403. If the user accepts any license terms at block 405, the software will display program description and other user helpful materials at block 407. The human user is then asked whether he wishes to customize the program interface at block 409. If he does not, the installation program continues until the installation is complete. But if he does wish to customize the interface, a customized interface subroutine at block 411 is entered before the installation program is complete.

Figure 5:
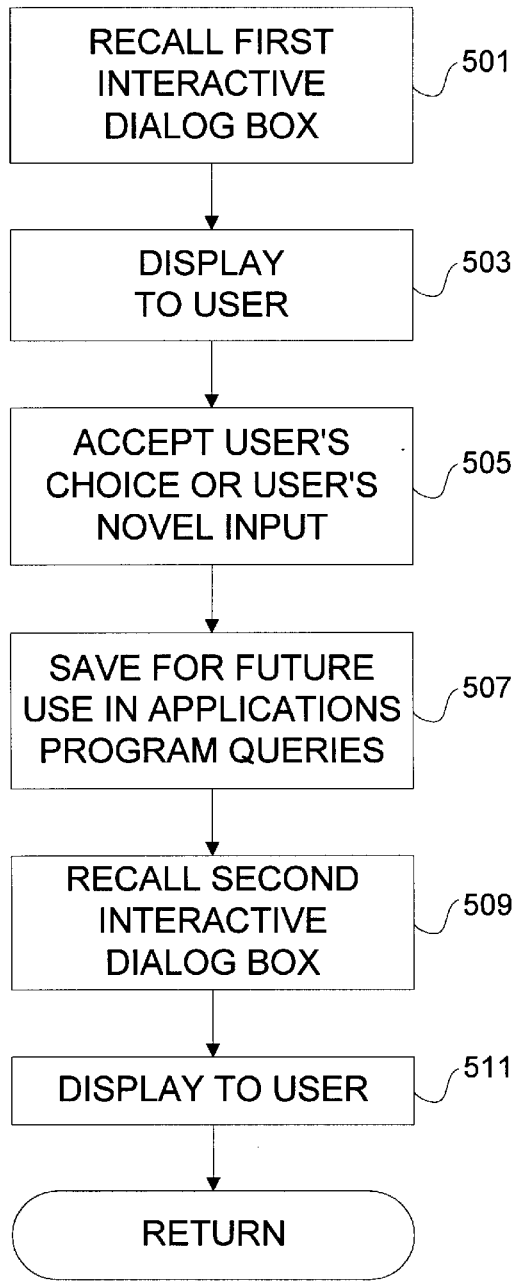
FIG. 5 is a flowchart of a customize interface routine which may be incorporated into the flowchart of FIG. 4.

A general customized interface routine is shown in the block diagram of FIG. 5. The applications program generally has a limited number of opportunities during which it must interface with the human user over grammar and semantics in a way that the human can perceive the interaction. Usually, a user is not interested in communicating with the applications program, itself; the user wants the applications program to perform its function with little annoyance to the user. Even a game applications program strives to have program transparency to allow the user to uninterruptedly play the game. Typically the user-applications program interaction would be found in subroutines like the help routine and screen preferences routines, but can also be utilized in any type of query or presentation of knowledge an applications program needs to make of or to the human user. For the expected limited number of interaction opportunities for this embodiment, the interaction described relative to FIG. 5 is useful for understanding the present invention.

When the user wishes to customize the interface in one embodiment of the present invention, the applications program, upon installation, recalls a first interactive dialog box at block 501 and displays it to the human user at 503. A representative dialog box for the customization is shown in FIG. 6. The human user is asked to select a message that is to be presented to the user, when, for example, a desired graphics file cannot be opened by a graphics manipulation applications program. The human user may select one of several previously written messages or the human user may, based on earlier experiences with similar files, compose a message that is particularly meaningful to the human user in this instance. The user selective applications program grammar and semantics routine then accepts the user's choice or novel input at 505 and saves the choice or novel input for future use in the later applications program queries of the user or presentation of knowledge to the user, at 507. The user selective applications grammar and semantics program then proceeds to recall a second interactive dialog box, at 509, display it to the human user at 511, and proceed to accept the user's choice or novel input and to save the choice or input for future applications program use, as it did for the first interactive dialog box. This process continues until all the previously stored interactive dialog boxes in the applications program have been reviewed and a user preference indicated for the boxes. At this time the installation program is reentered and proceeds to completion.

If the number of dialog boxes becomes too extensive and requires too much human user time during installation, an alternative embodiment utilizes the ability to passively learn of the user's preferences, based on extended application use by the user. These user preferences would include word searches, menu choices, and types of documents viewed or created. The user selectable applications grammar and semantics routine would observe these actions and choices and formulate a grammar algorithmically.

A more extensive use of a user selectable applications grammar and semantics capability is found when a user contacts a data source web site via a network such as the Internet. In this instance, the data source wishes to communicate clearly and unambiguously with the user and the user wants to gain a through understanding of what is being presented. Regional as well as international differences in semantics, grammar, and syntax make it highly desirable, if not necessary, to be sure that communications between the user and the source occurs without unintentional distortion of meaning due to such regional and international differences. Enabling the human user to select the meaning of the words and phrases being used in an a priori fashion means that future communications can be performed with a minimum of misunderstanding. An advantage of this clear communications enables the data source to obtain valuable human user input to improving its interface. When the data source is providing a product (such as an applications program) or a service (such as a repair and maintenance function), human feedback regarding a choice of language terms and meanings can improve the product or service. This improvement is of particular importance for software developers where there is a wide geographic or experience distribution of consumers. Some have little or no application experience while other are avid "computer geeks" and each individual has his or her own unique way of communicating employing their own definitions and colloquialisms. Using human user customizations via an interactive web site allows the software developer to customize later versions of software for the majority of individuals most likely to use it. There is, of course, a concern over the matter of privacy. Where the user's selection is collected overtly, the user knows that grammar and semantics selections provided to the data source are being collected and used for product enhancement. Presumably, the user agrees to this. More troubling is the covert, passive learning algorithm of user selection collection. At this time, it is expected that the integrity of the data source, itself, will provide the user assurances of privacy. The privacy concern notwithstanding, the composite of user selections would be incorporated in future releases of the software.

Figure 7:
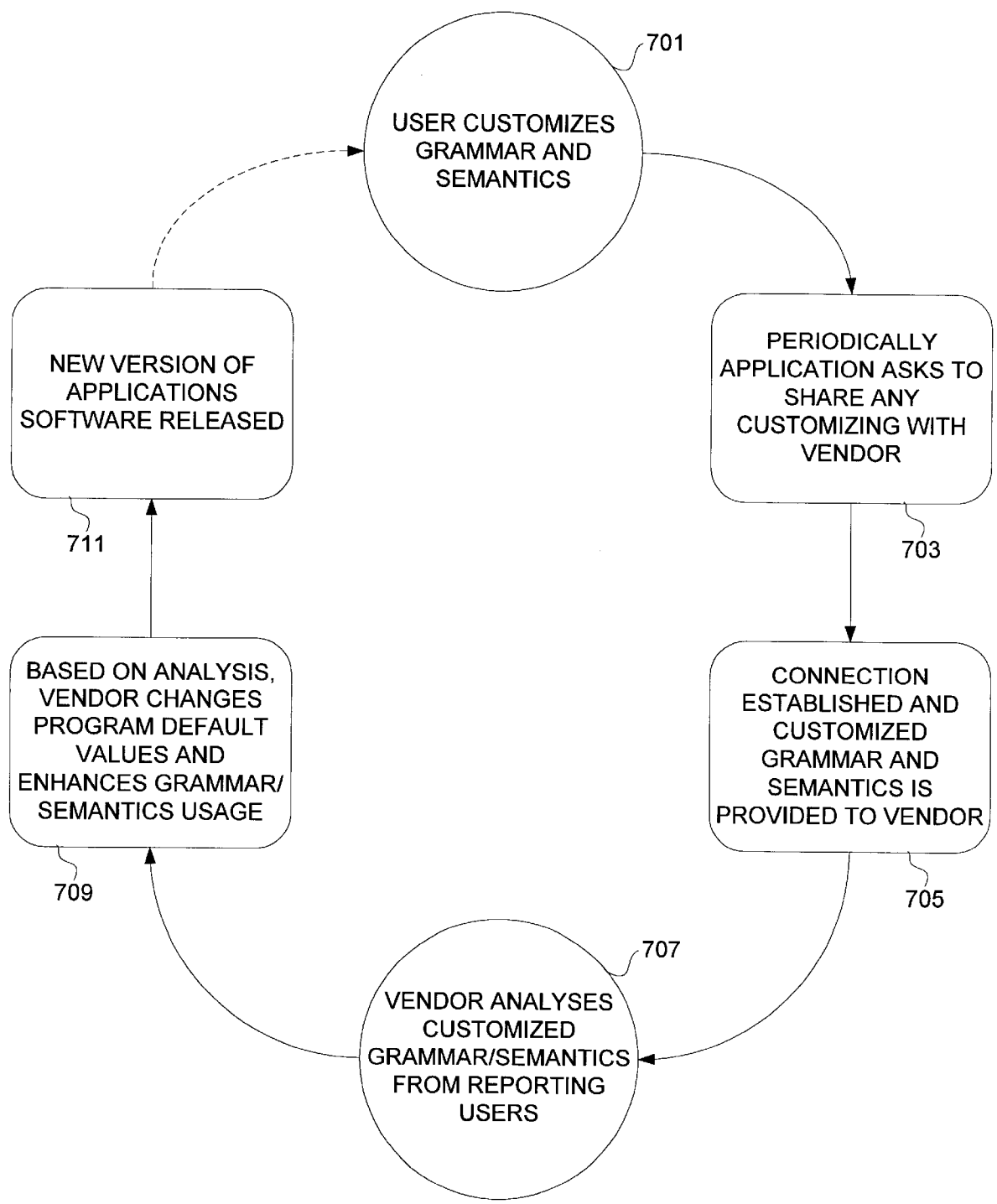
FIG. 7 is a diagram illustrating the flow of grammar and semantics customization.

A software vendor, employing the present invention, will be able to advantageously use a user's customizing of the grammar and semantics of applications software and similar items (such as web pages and electronic questionnaires). This use is shown diagrammatically in FIG. 7. The user of the applications software customizes the grammar and semantics of the software, at start-up as described above or at convenient times during the use of the software, represented at 701. Periodically, the applications software requests permission from the user to share the user's customization with the software vendor, represented at 703. Assuming that permission is granted, the applications software establishes a connection to the vendor and provides the user's customized grammar and semantics to the vendor, represented at 705. In the preferred embodiment, such a connection is made from the user's applications software, by way of the Internet, to a receptive portion of the vendor's established website at a time that inconveniences the user as little as possible. Alternatively, the vendor's site can periodically query the user's software or a dial-up connection can be made directly to a predetermined telephone number. Once the vendor is in receipt of all the reporting users (or as many as the vendor deems sufficient) the vendor analyzes the grammar and semantic changes made by the users, represented at 707, and determines what changes best suit the majority of users. It is expected that the vendor will employ a relatively simple totalizing of the user customizations to establish revised grammar and semantics for the applications software. However, the data returned from the users will include some identifying characteristics, again with the user's knowledge and assent, that provides the vendor with categories (for example geographic location) that will aid the vendor in producing applications software that can be better tailored for the users in the identified category.

Based on the analysis, the vendor can revise the applications software from its default values or previous versions to include the selected customized grammar and semantics, represented at 709. The revised applications software can then be released, represented at 711, in a general and wide distribution or in targeted areas and categories to better serve the user. The user is then free to upgrade the applications software employed by the user.

A dialog box for such a grammar/semantics selection is shown in FIG. 8. The user is given four conventional words that the supplier believes encompass the concept of "documents on the Internet, automatically retrieved at a time you specify and printer to your preferred printer". Further, the human user is given the opportunity to provide yet another term more familiar to the human user for the concept. Likewise, in FIG. 9 a selection of six conventional words and one human user selectable word is provided as a choice for the concept of "preventing a regularly scheduled activity from occurring for a temporary, but unspecified period of time". The user's response to these and the other dialog boxes are stored with a reference identifier to the particular human user responding to these questions and later communication between the web site and the user, for example, for an instant delivery printing service, the user's choice of words would be used in communication with that user.

Figure 10:
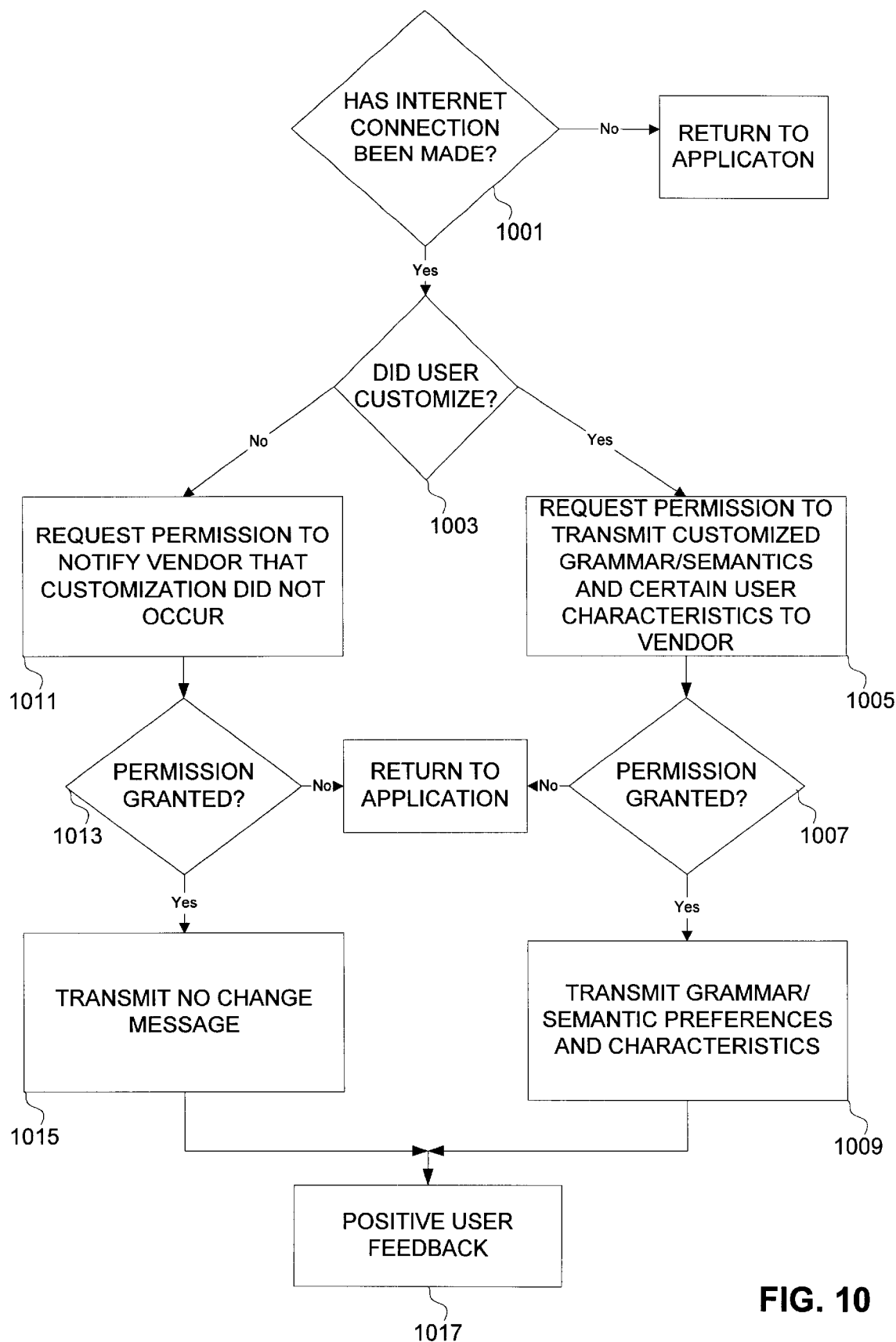
FIG. 10 is a flowchart of the process which may be employed in the present invention and followed by user applications software in asking to transmit user customizations to the vendor.

In a preferred embodiment, the user applications software will periodically ask to transmit customizations to the vendor. This process is shown in the flowchart of FIG. 10 (The vendor may employ a market research organization to collect and analyze the customization data, and data transmission may be to the market research organization rather than to the vendor directly. This implementation selection should not be taken to limit the present invention). If, in the preferred embodiment, the internet connection has been made, at 1001, a determination of whether the user has customized the grammar and semantics of the applications software, at 1003. If there has been customization, the user is asked, at 1005, for permission to transmit the customized grammar/semantics as well as certain inoffensive characterizations to the vendor. (An advanced version of the invention includes gradations of permission, enabling the user to grant permission for some types of customizations to be transmitted and for some categories of user characterizations to be transmitted, while permission for other customizations and characteristics are denied). Should permission be denied, the applications software returns to its useful state; should permission be granted, at 1007, the grammar/semantics preferences and the user characteristics are transmitted to the vendor, at 1009.

If the user did not customize any of the grammar/semantics of the applications program, at 1003, permission is requested to notify the vendor that customization did not occur, at 1011. Assuming, at 1013, that permission is granted, a transmission of a no change message occurs, at 1015. Regardless of whether any customization occurred, a positive feedback is given to the user, at 1017, as a "thank you" for the permission to contact the vendor. This feedback usually takes the form of a message conveying the vendor's gratitude for the user's participation. However, the vendor may provide a reward, such as a redeemable coupon, for the user's participation.

Figure 11:
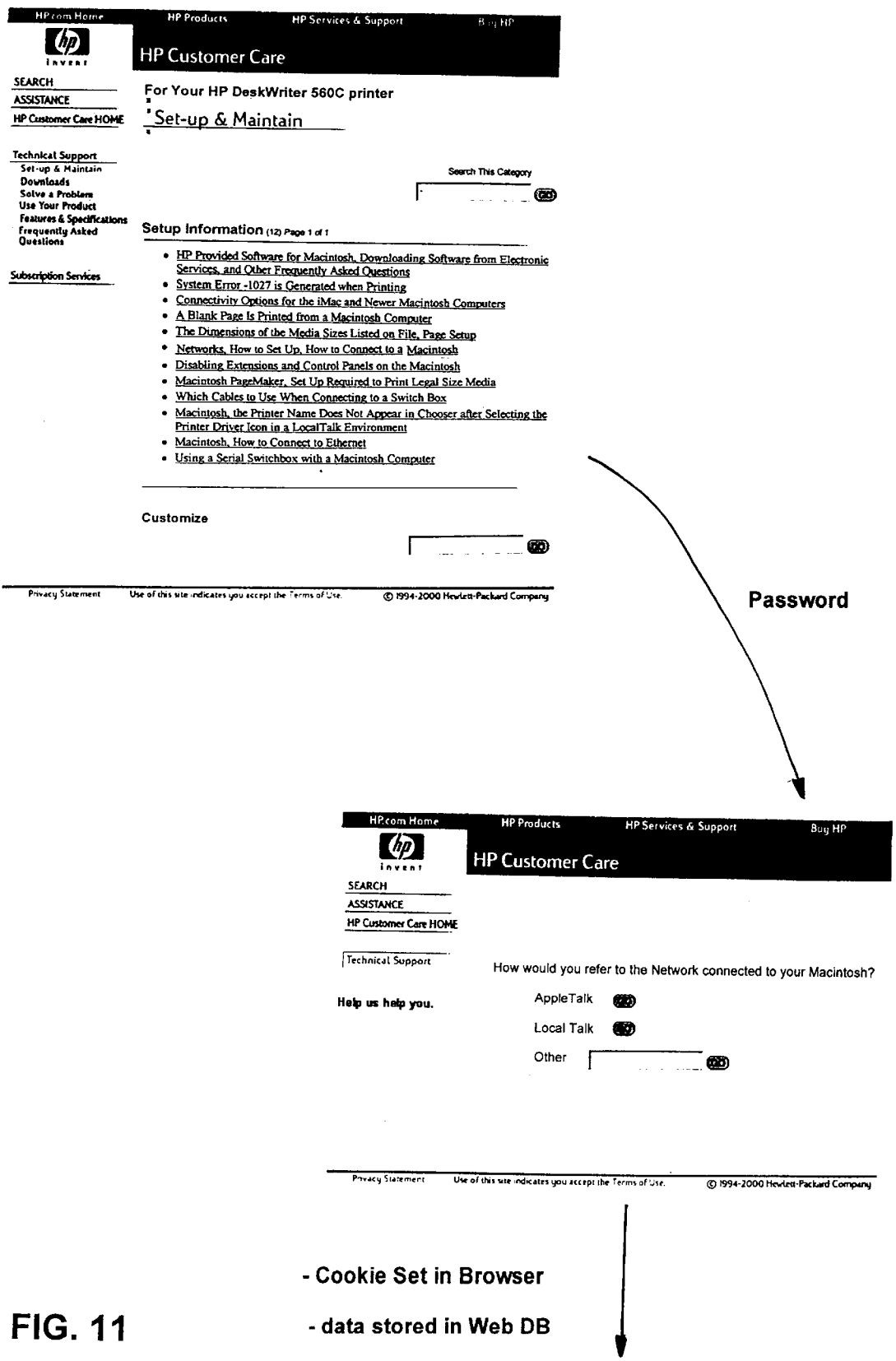
FIG. 11 is a diagram of a web page mediated customization which may be employed in the present invention.

If the customizing exchange occurs via a website, a more directly involved user interaction may be required. In a website embodiment, a vendor's web page may include a "Customize" selection as shown in the diagram of FIG. 11. The user may select a particular word of concern for which the user may want to modify. In FIG. 11, the user may, for example, want a better definition of the word "Networks". The user can enter the word in the customize box and click "Go". Alternatively, the user may be presented with a list of words or phrases for which the vendor may need a better understanding of what the user prefers or the user may simply be prompted to enter the customizing phase. In a preferred embodiment after the click, the user is requested to enter a password before being presented with a web page list for selection. After the user makes a selection and presses "Go", a cookie is set in the user's browser and the user's selection is stored in the vendor's web database.

An added benefit to products and services employing the user customization of grammar and semantics of the present invention is that of enabling product maintenance and support staff to have access to the user's choice of grammar and semantics—especially when complicated technical matters are involved. For example, a human user experiencing a problem with a software program and who had taken advantage of the opportunity to customize the grammar and semantics to that which the user preferred on the software producer's web site, would be able to converse with a service person using the human user's familiar grammar and semantics to describe the complicated problem. The service person, upon identifying the human user and obtaining a linkage between that human user and that user's customization information, would be able to have a more meaningful conversation with the human user using terms familiar to that particular human user.

Thus, an improved communications interface between human and intelligent machine is realized in the present invention, which utilizes human customizable grammar and for communication.

I claim:

1. A method for customizing a computer program user interface comprising the steps of:

displaying an interactive dialog box to a user prior to the use of the computer program, said dialog box listing at least two choices of text in the same language for use in conveying a specific computer program message;

accepting a user's choice of text; and saving said accepted text choice integral to the computer program for each later presentation of said text when said message is to be displayed to the user during use of the computer program in response to a non-user stimulus in the computer program.

2. A method in accordance with the method of claim 1 wherein said displaying step further comprises the step of providing a choice of user-generated text in addition to said at least two choices and wherein said step of accepting a user's choice of text further comprises the step of accepting said user-generated text in response to said user choosing said choice of user-generated text.

3. A method in accordance with the method of claim 1 further comprising the step of requesting permission from said user to disclose said user's choice of text to another.

4. A method in accordance with the method of claim 1 further comprising the step of disclosing said user's choice of text to another.

5. A computer system comprising:

a processor;

a storage coupled to said processor;

at least one user interface device to receive input from a user and present material to said user in human perceptible form; and an instruction set cooperating with said processor and said storage to:

display an interactive dialog box to a user prior to the use of the computer program, said dialog box listing at least two choices of text in the same language for use in conveying a specific computer program message;

accept a user's choice of text; and save said accepted text choice integral to the computer program for each later presentation of said text when said message is to be displayed to the user during use of the computer program in response to a non-user stimulus in the computer program.

\* \* \* \* \*